United States Patent [19]

Fischer II et al.

[11] 4,185,270

[45] Jan. 22, 1980

[54] FINGERPRINT IDENTIFICATION METHOD AND APPARATUS

[75] Inventors: Frederic P. Fischer II; Phillip G. Pflueger, both of Williamsville, N.Y.

[73] Assignee: Fingermatrix, Inc., North White Plains, N.Y.

[21] Appl. No.: 915,475

[22] Filed: Jun. 14, 1978

Related U.S. Application Data

[63] Continuation of Ser. No. 706,728, Jul. 19, 1976, abandoned.

[51] Int. Cl.² .............................................. G06K 9/00
[52] U.S. Cl. .............................................. 340/146.3 E
[58] Field of Search ...................... 340/146.3 E, 149 R

[56] References Cited

U.S. PATENT DOCUMENTS

| | | | |
|---|---|---|---|
| 3,292,149 | 12/1966 | Bourne | 340/146.3 E |
| 3,492,646 | 1/1970 | Bene et al. | 340/146.3 Q |
| 3,582,889 | 6/1971 | Bodez | 340/146.3 E |
| 3,638,188 | 1/1972 | Pincoffs et al. | 340/146.3 AC |
| 3,699,519 | 10/1972 | Campbell | 340/146.3 E |
| 3,748,644 | 7/1973 | Tisdale | 340/146.3 Q |
| 3,959,884 | 6/1976 | Jordan et al. | 340/146.3 E |

OTHER PUBLICATIONS

McMahon et al., "A Hybrid Optical Computer Processing Technique for Fingerprint Identification", *IEEE Trans. on Computers*, vol. C-24, No. 4, Apr., 1975, pp. 358-369.

Liv et al., "Computer-Assisted Fingerprint Encoding & Classification", *IEEE Trans. on Man-Machine Systems*, Sep., 1970, pp. 156-160.

Rad, "Feature Extraction for Fingerprint Classification", *Pattern Recognition*, Jul., 1976, vol. 8, No. 3, pp. 181-192.

Moayer et al., "A Tree System Approach for Fingerprint Pattern Recognition", *IEEE Trans. On Computers*, 3-1976, pp. 262-274.

*Primary Examiner*—Leo H. Boudreau
*Attorney, Agent, or Firm*—McAulay, Fields, Fisher & Goldstein

[57] ABSTRACT

A process and apparatus for encoding the ridge endings and bifurcations of an inquiry fingerprint and for automatically searching through a file of similarly encoded fingerprints for the fingerprint(s) whose minutiae are most similar to those of the inquiry fingerprint. The process does not require registration of the minutiae prior to storage or searching and the storage and search of file fingerprint cards can be implemented on a digital computer system since the minutiae data from each print is in a form easily processed by computer.

5 Claims, 15 Drawing Figures

FINGERPRINT IDENTIFICATION METHOD AND APPARATUS

This is a continuation of application Ser. No. 706,728, filed July 19, 1976, now abandoned.

Fingerprints consist of a pattern of lines corresponding to the pattern of epidermal ridges and valleys on the fingers. The points where the ridges end or fork are called minutiae and are considered to uniquely identify individuals. The X and Y location of minutiae and their angles, $\theta$, relative to a coordinate system can be encoded and stored as digital information. A fingerprint identification system based on minutiae matching must determine whether a set of minutiae from a query or "search" print matches any one of the sets of minutiae on file.

Previously existing minutiae-matching processes have required that the coordinate systems relative to which the coordinates of the search and file minutiae are measured must be in angular alignment, or "registered" so that the X and Y loction of a minutia on one print is similar to the X and Y location of the same minutiae on a matching print. However, the major source of minutiae data is from automatic fingerprint card reading equipment whose coordinate systems are aligned with the card edges, not the fingerprint on the card. Consequently, to satisfy the minutiae matching process, the minutiae data must be automatically transformed to a standard position in a second phase of processing prior to storage on file or searching a file. However, developing consistent procedures to register prints manually, to say nothing of registering prints automatically, has proven to be a difficult problem, especially for prints such as arches whose patterns do not have easily identified features which can be used for alignment. Further, for partial latent prints, registration may be impossible.

In determining whether two sets of minutiae data are from the same fingerprint, the two sets of X, Y and $\theta$ minutiae data from two fingerprints are loaded into two separate data buffers. One buffer constitutes the "search" buffer and the other buffer constitutes the "file" buffer. Pairs of "file" and "search" minutiae are sequentially loaded into a subassembly which computes the amount of position and angle repositioning of the search print coordinate necessary to register the search minutia over the file minutia. This process is repeated for every possible combination of search minutiae and file minutiae. If there are $N_s$ search minutiae and $N_f$ file minutiae, the total number of computations would be $N_s \times N_f$.

For each computation, three registration parameters, $X_r$, $Y_r$ and $\theta_r$ are generated. These parameters are used to address a third data file called the "histogram" file. This file has an address corresponding to every possible expected combination of $X_r$, $Y_r$ and $\theta_r$, where the units of $X_r$, $Y_r$ and $\theta_r$ are chosen with granularity appropriate to the inherent noisiness of the data, and the range $X_r$, $Y_r$ and $\theta_r$ extend over the maximum possible displacements and rotations expected.

Each location in the histogram file represents the number of times a particular combination of registration parameters $X_r$, $Y_r$ and $\theta_r$ occurs. At the start of a matching process, the contents of all locations in the histogram file are set to zero. As the process proceeds, the results of each computation are used to address the histogram file and increment the count stored at that location.

When all computations are complete, the histogram file is examined to find the locations with the highest counts. If the search and file minutiae sets are from non-matching prints, the registration parameters will tend to be more or less uniformly distributed over large areas of the histogram file. If the search and file minutiae sets are from matching prints, then the registration parameters for the matching minutiae will be all nearly the same and will tend to all fall in a small number of locations in the histogram file. Thus, there will tend to be a cluster of locations in the histogram file that have higher counts than the rest of the locations that contain registration parameters from non-matching minutiae. Standard cluster-finding techniques can be used to locate the cluster of locations with the highest total count. For example, the histogram file may be searched to find the set of the top $N_h$ locations that are contiguous in $X_r$, $Y_r$ and $\theta$ and that have the highest total count of any such $N_h$ contiguous locations where $N_h$ is a selectable number such as 10. This maximum total count is a measure of the degree of match of the two fingerprints. The minutiae data for the file prints may be stored in a disk memory or on magnetic tape and, under the control of a small minicomputer, selected segments of the disk or tape may be read by the matcher.

It is an object of this invention to provide a method and apparatus suitable for making an automatic search of latent prints where registration may be impossible.

It is a further object of this invention to provide a method and apparatus for determining whether two sets of minutiae data are from the same fingerprint.

It is an additional object of this invention to provide a method and apparatus for indicating the degree to which two fingerprints match independent of registration.

It is a further object of this invention to provide a method and apparatus for matching fingerprints which can operate on partial prints and thus can be used for identifying latent prints.

It is a still further object of this invention to provide a method and apparatus for minutiae matching that does not require angular registration and make practical the high-speed automatic matching of prints from conventional fingerprint cards and latent fingerprints.

It is an additional object to permit fingerprint cards or latent fingerprint images to be manually encoded and searched against a fingerprint data base stored in digital form. These objects, and others as will become apparent hereinafter, are accomplished by the present invention.

BRIEF DESCRIPTION OF THE DRAWINGS

For a fuller understanding of the present invention, reference should now be made to the following detailed description thereof taken in conjunction with the accompanying drawings wherein:

The operation of the minutiae matching process will be best understood in terms of a manual matching operation as will be described below. FIGS. 1 and 2 illustrate how a ridge ending and a valley ending or bifurcation are encoded. FIG. 3 represents a file print having one of its many minutiae located at $X=X_f$, $Y=Y_f$. The minutiae ($X_f$, $Y_f$) represents the end or bifurcation of a ridge and is represented by a circle having a tail extending in the direction of the ridge or valley ending. The search print, as shown in FIG. 4 has a plurality of additional minutiae as exemplified by a minutiae located at $X=X_s$, $Y=Y_s$. Also shown in FIG. 4 is the point ($X_b$, $X_b$) which is called the bench mark. The location of this point is a parameter of the matching process, but is a fixed constant.

Figure 5:
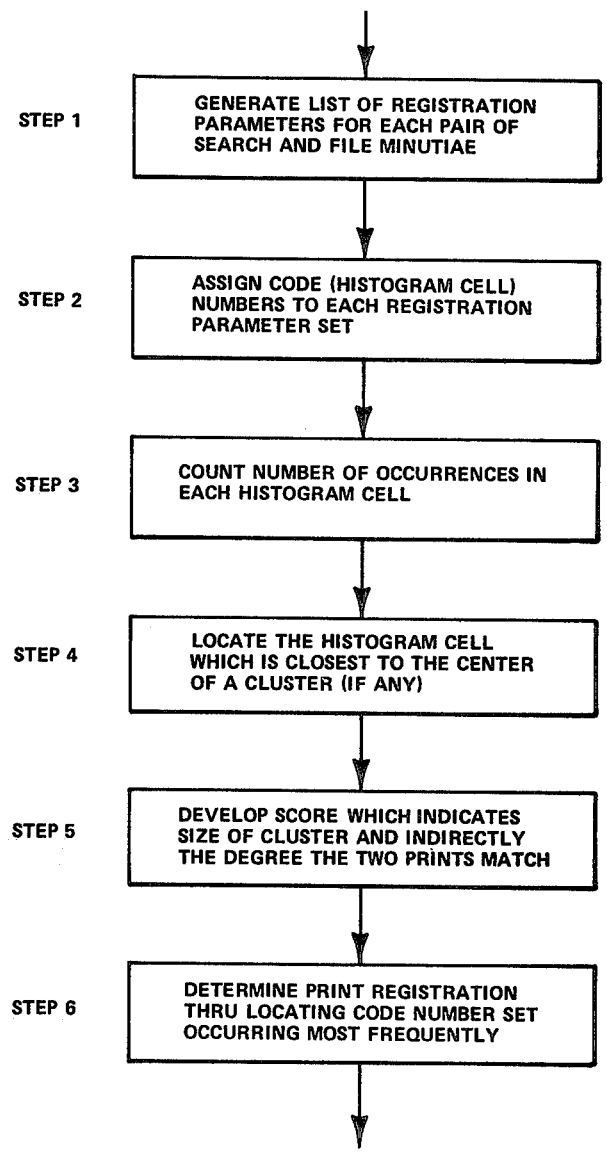
FIG. 5 is a flow diagram of the matching process.

The matching process can be described in terms of six steps as illustrated in FIG. 5. The first step consists of a plurality of computations.

Figure 1:
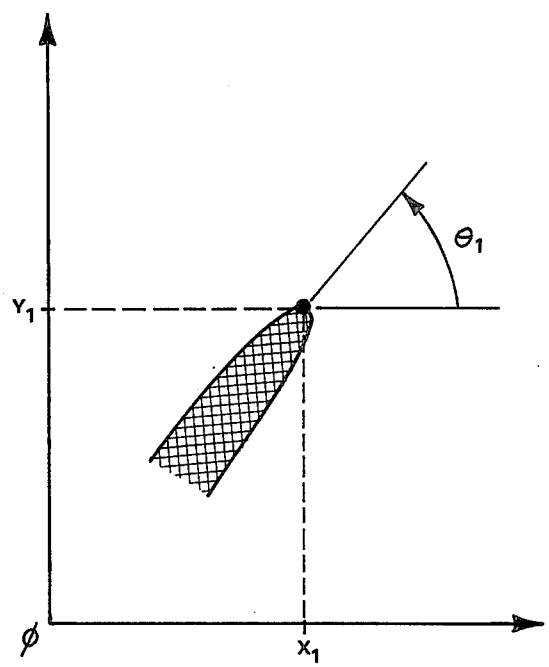
FIG. 1 illustrates the descriptors of a ridge ending.
Figure 2:
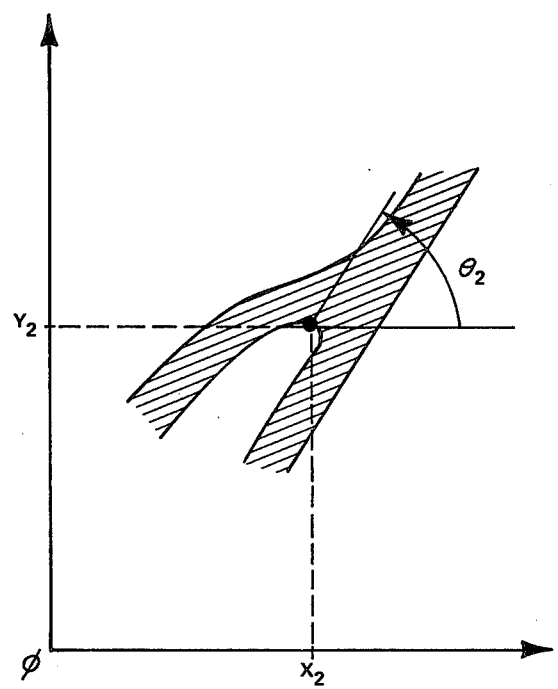
FIG. 2 illustraates the descriptors of a valley ending.
Figure 3:
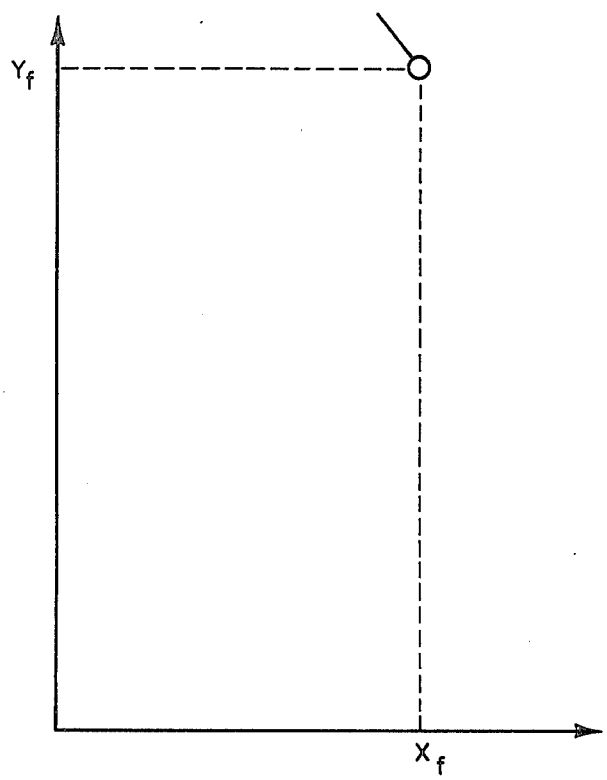
FIG. 3 is a representation of the location of a minutia on a file card.
Figure 4:
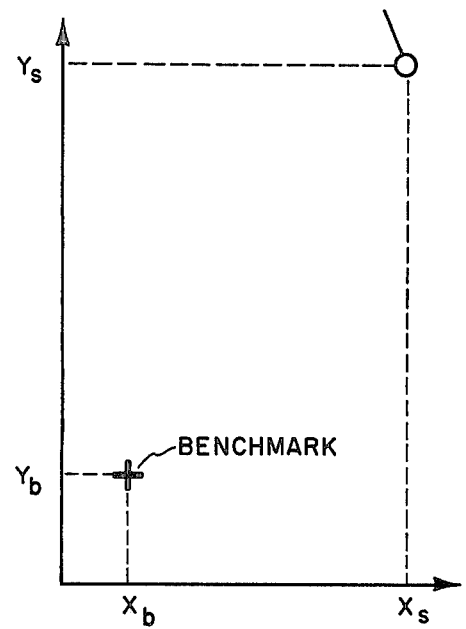
FIG. 4 is a representation of the location of a minutia on a search card.
Figure 6:
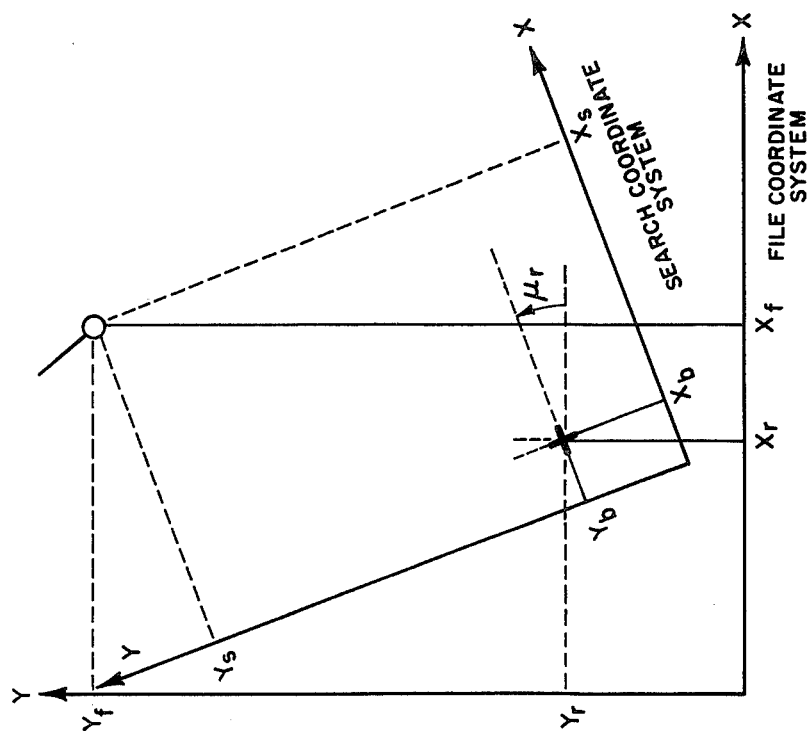
FIG. 6 is a representation of FIG. 4 superimposed on FIG. 3 and oriented to match minutiae.

FIG. 6 illustrates one computation of Step 1 of the matching process of FIG. 5 wherein FIG. 4, the search print, is superimposed on FIG. 3, the file print, and oriented so that the minutiae, $X_s$, $Y_s$, is superimposed on the minutiae $X_f$, $Y_f$ with their tails extending in the same direction. The counterclockwise angle through which the search print must be rotated to achieve superposition is represented $\mu_r$. The point ($X_r$, $Y_r$) in the file coordinate system directly under the "benchmark" ($X_b$, $Y_b$) on the search coordinate system, together with the angle $\mu_r$, are sufficient information to completely describe the registration of the search print relative to the file print so that the search and file minutiae are in juxtaposition in both position and angle.

Figure 7:
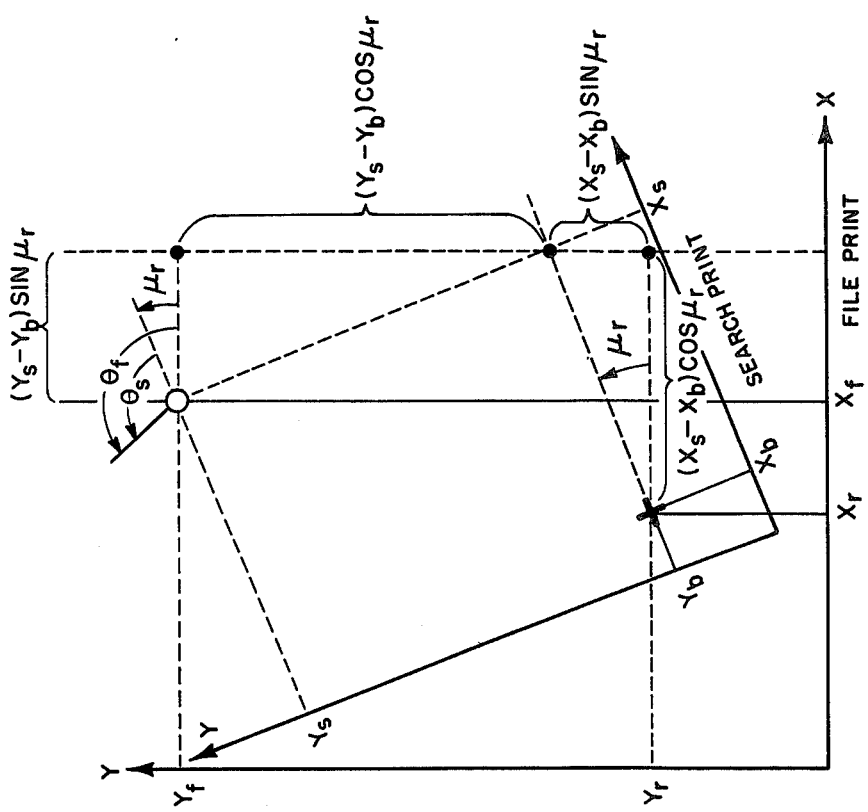
FIG. 7 is similar to FIG. 6 and illustrates the derivation of the transformation equation.

The registration parameters $X_r$, $Y_r$ and $\mu_r$ which position a search minutiae over a file minutiae can also be defined mathematically instead of graphically. In terms of $X_s$ and $Y_s$, and $X_f$ and $Y_f$, the X and Y locations of the search and file minutiae respectively, $\theta_s$ and $\theta_f$, the angles of the search and file minutiae respectively, the registration-defining parameters $X_r$, $Y_r$ and $\mu_r$ with the aid of FIG. 7 can be calculated from the following equations:

$$X_r = X_f - (X_s - X_b) \cos \mu_r + (Y_s Y_b) \sin \mu_r$$

$$Y_r = Y_f - (X_s - X_b) \sin \mu_r - (Y_s - Y_b) \cos \mu_r$$

$$\mu_r = \theta_f - \theta_s$$

Step 1 of the matching process of FIG. 5 consists of performing the above described registration process using either the graphic or mathematical method on all different possible pairs of search and file minutiae. If there are $N_s$ search minutiae and $N_f$ file minutiae, then there are $N_s \times N_f$ such computations. For each computation, the registration parameters $X_r$, $Y_r$ and $\mu_r$ are stored in a list.

Once all computations have been completed and the registration parameters have been stored, Step 2 of the matching processes is started. Steps 2, 3, 4, 5 and 6 consist of processing the list of $X_r$, $Y_r$ and $\mu_r$ registration parameters generated in Step 1. If the search and file prints were of the same finger, the computations for those file and search minutiae pairs which indeed did match will result in similar registration parameters and would form a tight cluster among the remaining set of registration parameters. The object of the remaining steps of the matching process is to test for the existence of a cluster of registration parameters in the list. The number of computations which resulted in registration parameters in the cluster is a measure of the degree to which the two prints match. The location of the cluster, i.e. the nearly equal values of the registration parameters which occur repeatedly, can be used to translate the search print minutiae so that the matching minutiae become in registration.

A process which implements the above objectives is described below.

Figure 8:
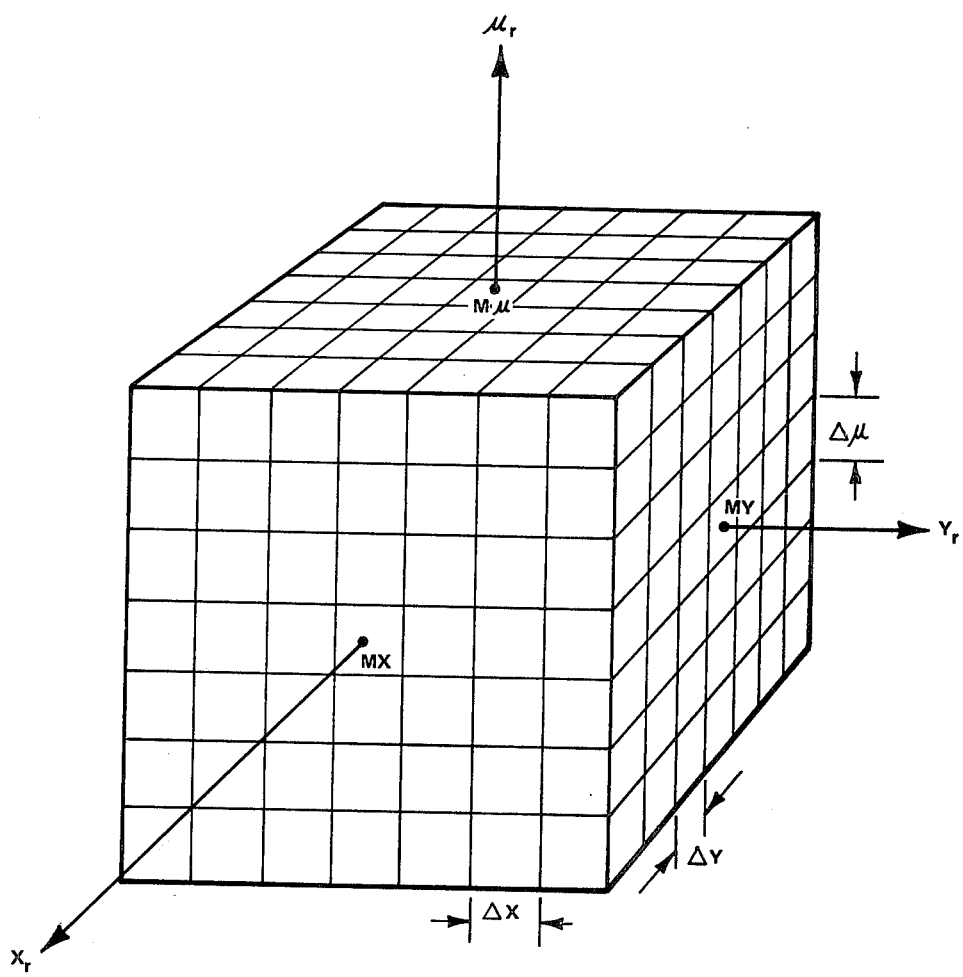
FIG. 8 is a histogram of the three-dimensional registration parameter space.

The range of possible values of $X_r$, $Y_r$ and $\mu_r$ can be divided up into a group of adjacent non-overlapping intervals. Each interval can be given a unique code number. A histogram of a three-dimensional registration parameter space is shown in FIG. 8.

Figure 9:
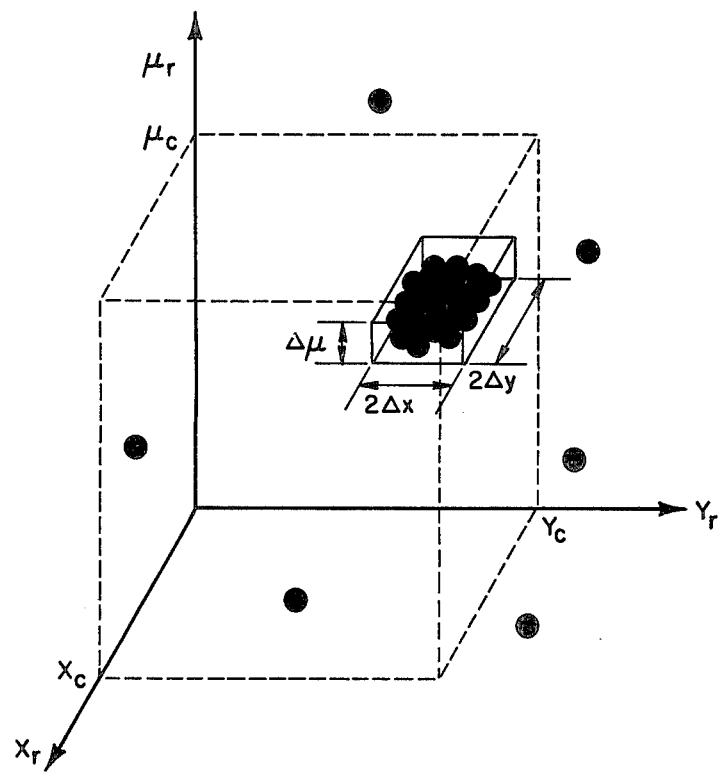
FIG. 9 is a geometric interpretation of a cluster of registration parameters in a histogram cell.

The three code numbers can be thought of as the label of a cell in a histogram as illustrated in FIG. 9. Thus the three registration parameters resulting from each computation in Step 1 can be assigned three code numbers which indicate which intervals the $X_r$, $Y_r$ and $\mu_r$ for that computation fell in, or equivalently, which histogram cell contains the registration parameters. Step 2 of the matching process consists of determining the histogram cell number resulting from each computation in Step 1.

The third step is to count the number of times each set of three code numbers occurred in the list. At the end of this process, it would be known, for example, that no registration parameter sets had the code number 0,0,0, two parameter sets had the code number 0,0,1, and so forth.

In the fourth step, the cell counts established in the preceding step are used to determine the location of the histogram cell to be called the center of the cluster of registration parameters, if it exists. There are many ways to accomplish this function. A simple method is to locate the histogram cell with the highest count, such as is illustrated in FIG. 9. A modification, for example, is to locate the cell whose count when summed with one half the sum of the 26 cell counts in the immediate neighborhood (those whose code numbers differ by no more than 1) is the highest.

In Step 5, the cluster about the center cell is "scored". That is, a number is developed which indicates the degree two prints match. The score should reflect the number of registration parameters about the center. Again, there are many ways to achieve this function. One method is to divide the largest count by the geometric average of the number of file and search minutiae. A second method is to sum the 27 cell counts of cells at or adjacent to the center cell and subtract from that sum 27 times the $10^{th}$ largest cell count over the histogram.

In Step 6, the single set of three registration parameters $X_c$, $Y_c$ and $\mu_c$ which will be said to best represent the registration of the search print upon the file print is then determined as a secondary result of the matching process for later use. A simple method is to take the midpoint of the intervals of the cells with the highest count as the registration parameters. Other methods take into the calculations the count weighted registration parameters of the histogram cells adjoining the cell termed the center to take into account that the cluster may straddle two or more cells.

Figure 10:
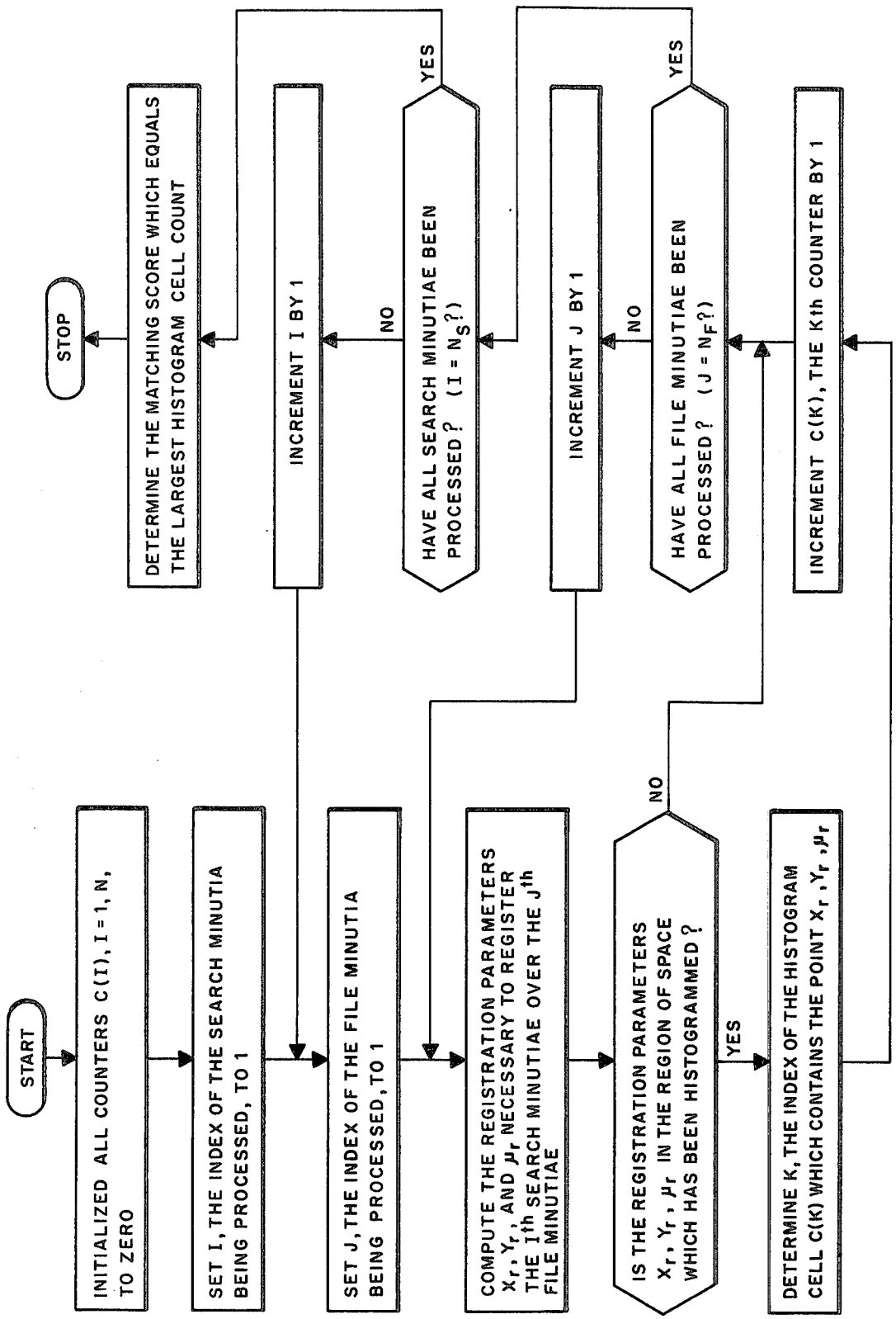
FIG. 10 is a generalized flow diagram of the registration-invariant matching procedure.

A simple process to implement the registration-invariant matcher is shown in FIG. 10 and is described as follows.

A double loop is established to sequence the index I (the search minutiae) and the index J (the file minutiae) so that all possible pairs (I, J) of search and file minutiae will eventually be accessed.

Within the innermost loop, computations are performed on the $J^{th}$ file minutiae and $I^{th}$ search minutia. More specifically, the registration parameters $X_{rij}$, $Y_{rij}$ and $\mu_{rij}$ required to register the $I^{th}$ search minutia over the $J^{th}$ file minutia are computed. If $X_{rij}$ or $Y_{rij}$ is outside the range of 0 to 1023, or if $\mu_{rij}$ is outside the range of $-60$ to $+60$ degrees, no more processing is done. Otherwise, the parameters are used to address a cell in a three dimensional histogram which is incremented by one. After all pairs of search and file minutiae have been considered, the largst histogram cell count is a measure of the degree of matching.

The equations used in the registration-invariant matching algorithm (RIM) to compute the registration parameters needed to register the $i^{th}$ search minutiae over the $J^{th}$ file minutiae were given previously as:

$$X_{rij} = X_{fj} - (X_{si} - X_b) \cos(\theta_{fj} - \theta_{si}) + (Y_{si} - Y_b) \sin(\theta_{fj} - \theta_{si})$$

$$Y_{rij} = Y_{fj} - (X_{si} - X_b) \sin(\theta_{fj} - \theta_{si}) - (Y_{si} - Y_b) \cos(\theta_{fj} - \theta_{si})$$

$$\mu_{rij} = \theta_{fj} - \theta_{si};$$

The registration parameters for each matching minutiae pair should form a cluster in parameter space which is detectable by cluster finding techniques. The size of the cluster is not a function of print registration.

The before mentioned process is capable of taking two fingerprints in any orientation and developing a matching score indicating the degree the two prints match. The process is not a perfect measure of the degree two prints match due to print distortion and histogram discreteness. For file prints whose matching score exceeds a threshold, a more discriminating matching algorithm can be utilized. Because the matching process generates the registration parameters defining how the search print minutiae should be translated in position and angle to align with the file print minutiae, the search print can be translated digitally. This enables matching algorithms which are not registration invariant to be used.

DESCRIPTION OF THE PREFERRED EMBODIMENT

Figure 11:
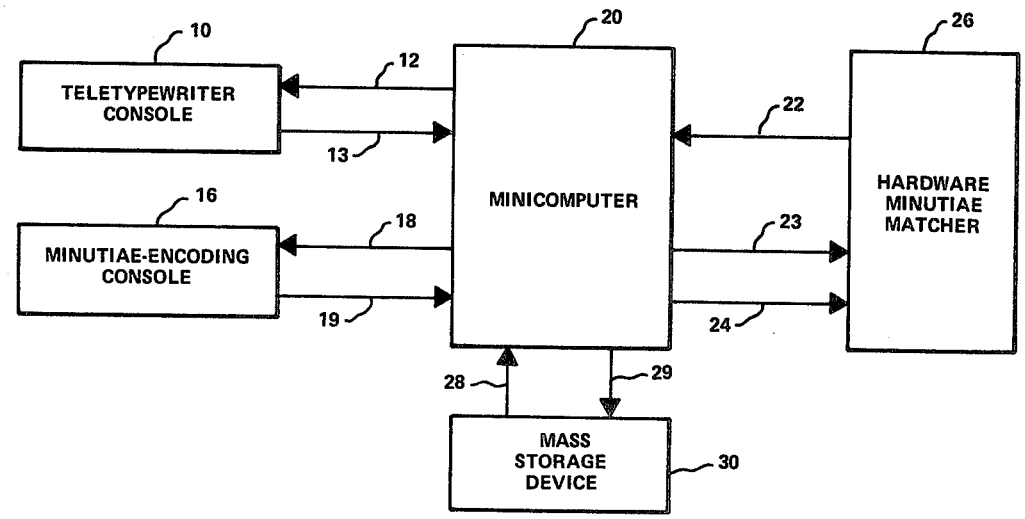
FIG. 11 is a block diagram of the fingerprint identification system.

In FIG. 11, the numeral 20 generally designates a minicomputer. A small, commercially available unit with no high-speed or large memory requirements would be suitable since a 32,000 word core would be adequate for a 200,000 card file. A teletypewriter 10 is a standard console unit with a keyboard for entering data and a typewriter for printing results. Data entered into the teletypewriter 10 is communicated to minicomputer 20 via line 13 and the output of minicomputer 20 is communicated to teletypewriter 10 via line 12. A minutiae-encoding console 16 which consists of an opaque copy projection system, a data digitizer tablet and a teletypewriter is connected to minicomputer 20 via lines 18 and 19. A special purpose hardware minutiae matcher 26 which is capable of computing a matching score from the minutiae for two prints in several milliseconds is connected to the minicomputer 20 via lines 22, 23 and 24 for communicating matching scores to the minicomputer 20 and for communicating search and file print minutiae data and classification to the hardware matcher 26. Mass storage device 30 which may include magnetic tape cartridges or the like is connected to minicomputer 20 via lines 28 and 29.

OPERATION OF THE SYSTEM OF FIG. 11

When the system of FIG. 11 is installed, the diskpacks or other magnetic storage units contained in the mass storage device 30 contain fingerprint minutiae data and the minicomputer 20 is programmed, the operation would be as follows:

1. An inquiry card would first be manually classified using the extended secondary Henry classification system or any other equivalent system so that each category should have no more than about 300 entries. The classification, entered manually into the system by the keyboard of teletypewriter 10 (or by means of minutiae encoding console 16), will specify to the system which segment, or segments in the case of partial prints, of the stored data file in mass storage device 30 will be searched for possible matching cards.

2. The card will then be positioned in the projection area of minutiae-encoding console 16 so that a magnified projection of fingerprint No. 1 is visible on the ground-glass table surface which forms a part of minutiae-encoding console 16.

3. The X and Y position of approximately 40 minutiae in a circular region centered on the print "center point" are encoded. Encoding is performed by moving a small positionable device (pen, scribe or cursor), such as GRAPH/PEN which is marketed by Science Accessories Corporation, Southport, Conn., about the table surface upon which the fingerprint is projected. A grid or spiral pattern may be superimposed on the magnified fingerprint to assist in systematically encoding the minutiae as the pen is moved about. The table is able to determine the exact position of the pen via transducers. When the pen is depressed the current X and Y position of the pen and hence the position of the minutiae can be transferred to the minicomputer 20. By "encoding" preselected boxes located at the edge of the screen, the operator can enter data and options under program control. The minutiae angles $\theta$ are encoded by entering a second point for each minutiae. The X, Y and $\theta$ coefficients of the minutiae are stored in the minicomputer 20 until the first print is completely encoded.

4. The minutiae set stored in minicomputer 20 as a result of step 3 is then matched against all file prints of the same finger number in the same classification bin, or, for a latent print that is not classifiable, against all prints on file. The card identification numbers of the cards with the highest matching scores are stored in a list in the minicomputer memory. Typically, 100 card numbers would be stored.

5. Steps 2 through 4 are repeated for the remaining four fingerprints of the right hand. Fewer fingers can be used in some applications.

6. The card identification numbers which appear in (typically) three of the five lists are presented to the operator on the teletypewriter console 10. These cards can then be obtained from the card file for final human verification.

The above procedure indicates one way of processing the outputs of the system to select the candidate fingerprint cards for subsequent human verification by the fingerprint technician. Additional processing can be performed in the general purpose minicomputer 20 to reduce the number of fingerprint cards requiring human checking. For example, angular registration information, which is an inherent by-product of the system, may be used to enable the use of high-confidence matching algorithms in the general purpose minicomputer 20. These algorithms run relatively slowly, typically one print per second, but they do allow a trade-off between computer time and technician time.

Figure 12:
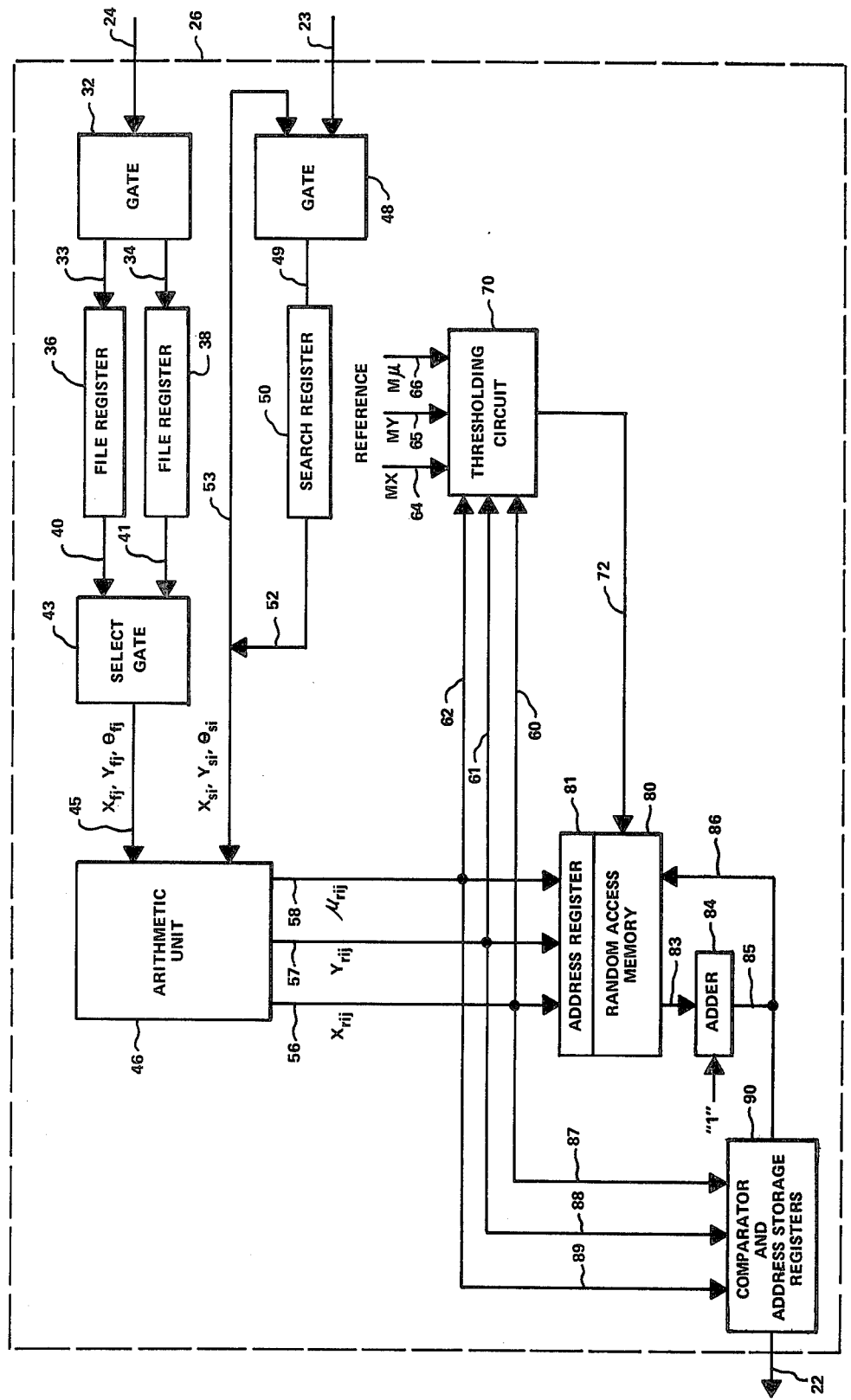
FIG. 12 is a block diagram of the hardware minutiae matcher of FIG. 11.
Figure 13:
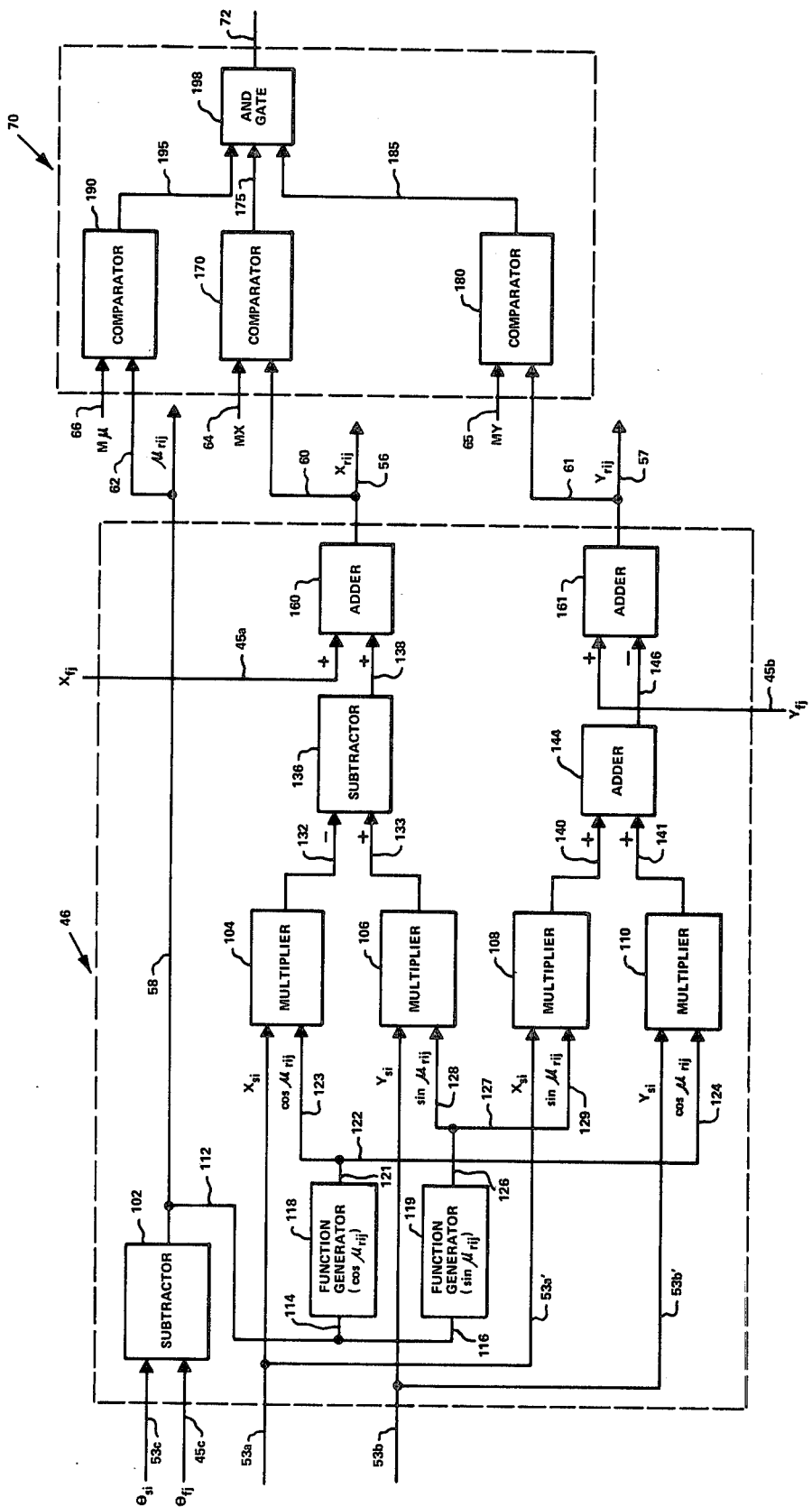
FIG. 13 is a block diagram of the arithmatic unit and threshold circuit of FIG. 12.

An overall view of the hardware minutiae matcher 26 is illustrated in FIG. 12. Matcher 26 is composed of file registers 36 and 38 which may be implemented in either shift registers or random access memory, a high speed arithemetic unit 46 which is capable of performing the required computations, a thresholding circuit 70, random access memory 80 and adder 84 for generating a histogram of potential matching minutiae and comparator and address storage registers 90 for storing the memory locations containing the cells with the ten largest numer of points in the histogram. By having all processing and computations performed serially, hardware requirements, assembly time and package size will be minimized.

OPERATION OF THE HARDWARE MATCHER OF FIG. 12

Hardware minutiae matcher 26 receives a first input from mass storage device(s) 30 via minicomputer 20 and lines 24. This input representing X, Y and $\theta$ minutiae information is supplied as an input to data selector gate 32. Gate 32 is connected via lines 33 and 34 with file registers 36 and 38, respectively, which are in turn connected to select gate 43 via lines 40 and 41, respectively, and select gate 43 is connected to arithmetic unit 46 via line 45. Although lines 24, 33, 34, 40, 41 and 45 are represented as single lines, they transmit X, Y and $\theta$ minutiae information and in actual practice are each made up of three lines. The minutiae data from the file prints are loaded into either file register 36 or 38, but both will be used with selection between them via gate 32 so that one register can be loaded with minutiae data for the next file print while data from the previous print is being processed. File minutiae data ($X_{fj}$, $Y_{fj}$, $\theta_{fj}$) will then be received by data selector gate 32 from mass storage device 30 via lines 28, minicomputer 20, lines 24 and will be transmitted to select gate 43 either via lines 33, file register 36 and lines 40, or via lines 34, file register 38 and lines 41. The output of gate 43 ($X_{fj}$, $Y_{fj}$, $\theta_{fj}$) representing the file minutiae is communicated to arithmetic unit 46 via lines 45. A second input signal is supplied from minicomputer 20 to minutiae matcher 26 via lines 23 and provides a first input to gate 48 and represents the search minutiae data ($X_{si}$, $Y_{si}$, $\theta_{si}$). The output of gate 48 is supplied to search register 50 via line 49. The output of search register 50 ($X_{si}$, $Y_{si}$, $\theta_{si}$) is supplied via lines 52 and 53 to provide a second input to arithmetic unit 46 and a second, feedback, input to gate 48. Lines 23, 49, 52 and 53, although represented by single lines, like other lines represented as carrying X, Y and $\theta$ information, would be made up of three lines in actual practice. The arithmetic unit 46 processes the inputs supplied via lines 45 and 53 and produces output ($X_{rij}$, $Y_{rij}$, $\mu_{rij}$) which are supplied to lines 56, 57 and 58, respectively, and are represented by the equations $$X_{rij} = X_{fj} - X_{si} \cos \mu_{rij} + Y_{si} \sin \mu_{rij}$$

$$Y_{rij} = Y_{fj} - X_{si} \sin \mu_{rij} - Y_{si} \cos \mu_{rij}$$

$$\mu_{rij} = \theta_{fj} - \theta_{si}$$

where $X_{fj}$, $Y_{fj}$, $\theta_{fj}$ and $X_{si}$, $Y_{si}$, $\theta_{si}$ represent the search and file print respectively. (It is assumed that the search minutiae coordinates $X_{si}$ and $Y_{si}$ are relative to an X Y coordinate system whose origin is at the "center of gravity" of the set of search minutiae and the bench marks $X_b$, $Y_b$ are both zero.)

The outputs ($X_{rij}$, $Y_{rij}$, $\mu_{rij}$) of arithmetic unit 46 represent how the search print must be rotated to match the file print and are supplied as inputs to address register 81 which is the address input of random access memory 80 and are supplied via lines 56, 57, 58, 60, 61 and 62 to thresholding circuit 70 and are supplied via lines 56, 57, 58, 87, 88 and 89 to comparator and address store 90. Thresholding circuit 70 receives reference signals MX, MY and M$\mu$ via lines 64, 65 and 66, respectively, and compares them with the computed values of $X_{rij}$, $Y_{rij}$ and $\mu_{rij}$. If the absolute values of signals $X_{rij}$, $Y_{rij}$ and $\mu_{rij}$ are each less than or equal to MX, MY and M$\mu$, the thresholding circuit 70 will generate a pass signal which will be supplied to random access memory 80 via line 72. The values of $X_{rij}$, $Y_{rij}$ and $\mu_{rij}$ that satisfy the constraints imposed by the thresholding circuit 70 will be formulated to provide unique address locations for random access memory 80. The thresholding circuit 70 thereby guarantees that excessively large values of $X_{rij}$, $Y_{rij}$ and $\mu_{rij}$ will cause the data to be discarded instead of stored in an erroneous location.

Random access memory 80 will operate in the split cycle (read-modify-write) mode. Each time a location of the memory 80 is addressed by $X_{rij}$, $Y_{rij}$ and $\mu_{rij}$, the contents are read and incremented by "1" by adder 84 before being rewritten back into memory 80 via lines 85 and 86. Each combination of $X_{rij}$, $Y_{rij}$ and $\mu_{rij}$ can be thought of as representing one cell of a three-dimensional histogram and an entry is made into a cell of the histogram each time that cell is addressed. This is pictorially represented by the circles in FIG. 8. The size of memory 80 is dictated by the number of unique cells in the histogram and is the product of the number of discrete values of $X_{rij}$, $Y_{rij}$, and $\mu_{rij}$. If $X_{rij}$ and $Y_{rij}$ are each allowed to assume 32 states, and $\mu_{rij}$ is segmented into 15 slices of 8 degrees each, then the number of words of memory required would be:

$$32 \times 32 \times 15 = 15,360 \text{ words}$$

Hence, a 16,000 word memory 80 would be suitable for matcher 26.

The output of adder 84 is delivered as an input to comparator and address storage registers 90 via lines 85 and 86. A record of the ten ($X_{rij}$, $Y_{rij}$, $\mu_{rij}$) locations containing the largest number of entries is determined and stored by comparator and address storage registers 90. With each update of the histogram (access to memory 80) the number of points in the cell is compared to the smallest value in the comparator and address storage registers 90. If the new value is larger, the smallest stored value is replaced by the new value. After all combinations of minutiae data from the search print have been processed, or matched, against all file prints in the appropriate classification bin, the contents of the comparator and address storage registers are read into minicomputer 20. Minicomputer 20 causes the final output data from the hardware minutiae matcher 26 to be displayed by teletype 10.

The address register 81 is comprised of standard flip-flops with one flip-flop used for each bit in $X_{rij}$, $Y_{rij}$ and $\mu_{rij}$. Address register 81 is used to supply the addressing information for the random access memory 80. The random access memory 80 provides storage for the histogram information generated during the matching process. This memory can be core, bipolar or MOS as long as it is compatible with the operating speed of the system. Word addressing is provided by address register 81. The memory is operated in a read-modify-write cycle with initiation of the cycle being in response to a signal received via line 72. During the read portion of the cycle, data appears at data path, or line, 83. During the write portion of the cycle, data is supplied to the random access memory 80 via data path 86.

OPERATION OF THE ARITHMETIC UNIT AND THRESHOLDING CIRCUIT OF FIG. 13

The equations of $X_{rij}$, $Y_{rij}$ and $\mu_{rij}$ for one file print can be solved by the high speed arithmetic unit 46 in a time period not exceeding one microsecond. The outputs of gate 43, $X_{fj}$, $Y_{fj}$ and $\theta_{fj}$, are supplied via data paths 45a, 45b and 45c, which together make up line 45, to provide first inputs to adders 160 and 161 and subtractor 102, respectively, of arithmetic unit 46. Similarly, the outputs of search register 50, $X_{si}$, $Y_{si}$ and $\theta_{si}$, are respectively supplied via data paths 53a and 53a' as first inputs to multipliers 104 and 108, via data paths 53b and 53b' as first inputs to multipliers 106 and 110 and via data link 53c as a second input to subtractor 102. The output of subtractor 102, $\mu_{rij}$, is supplied to line 58 and via lines 58, 112, 114 and 116 to provide inputs to function generators 118 and 119, respectively. The output of function generator 118, $\cos \mu_{rij}$, is supplied via lines 121, 122, 123 and 124 to provide second inputs to multipliers 104 and 110 and the output of function generator 119, $\sin \mu_{rij}$, is supplied via lines 126, 127, 128 and 129 to provide second inputs to multipliers 106 and 108. The output of multiplier 104, $X_{si} \cos \mu_{rij}$, and the output of multiplier 106, $Y_{si} \sin \mu_{rij}$, are supplied via lines 132 and 133, respectively, to subtractor 136 which supplies a second input, via line 138, to adder 160 which in turn produces an output, $X_{rij}$, which is supplied to line 56. The output of multiplier 108, $X_{si} \sin \mu_{rij}$, and the output of multiplier 110, $Y_{si} \cos \mu_{rij}$, are supplied via lines 140 and 141, respectively, to adder 144 which supplies a second input, via line 146, to adder 161 which in turn produces an output, $Y_{rij}$, which is supplied to line 57.

The outputs of arithmetic unit 46, $X_{rij}$, $Y_{rij}$ and $\mu_{rij}$, are supplied as first inputs to comparators 170, 180 and 190 of thresholding circuit 70 via lines 60, 61 and 62, respectively. Reference signals, MX, MY and M$\mu$, are supplied via lines 64, 65 and 66 to supply second inputs to comparators 170, 180 and 190, respectively. The computed values of $X_{rij}$, $Y_{rij}$ and $\mu_{rij}$ supplied to comparators 170, 180 and 190 are compared against the fixed values MX, MY and M$\mu$ and the results of the comparisons are supplied via lines 175, 185 and 195, respectively, to AND gate 198. If the outputs of comparators 170, 180 and 190 supplied to AND gate 198 indicate that $X_{rij} \leq |MX|$, $Y_{rij} \leq |MY|$ and $\mu_{rij} \leq |M\mu|$ then a pass, or cycle initiate, signal will be generated and supplied to line 72 which is connected to random access memory 80.

OPERATION OF THE COMPARATOR AND ADDRESS STORAGE REGISTERS OF FIGS. 14 AND 15

Figure 14:
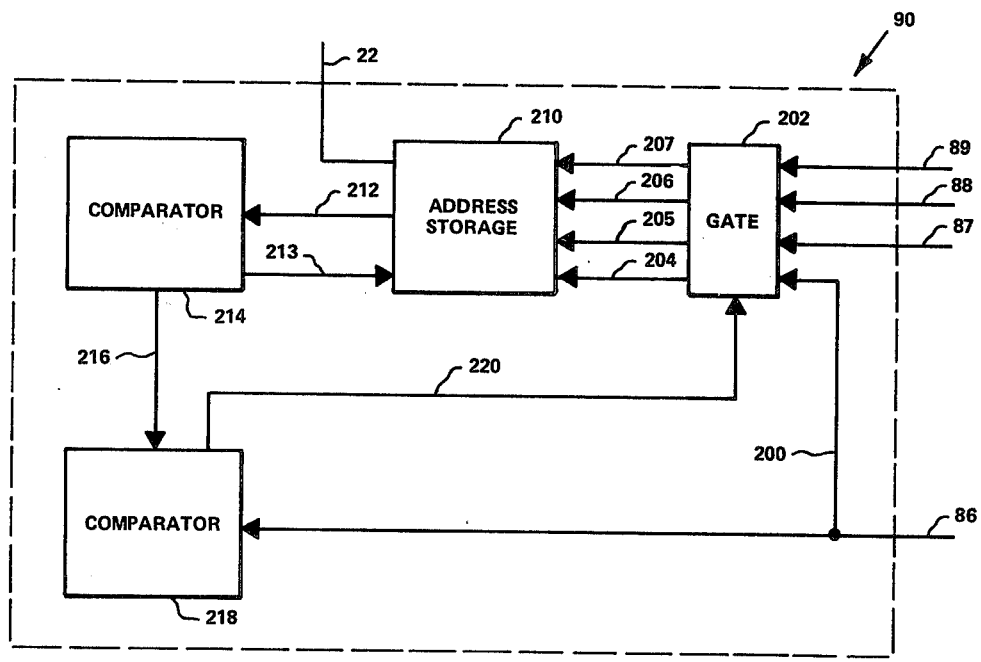
FIG. 14 is a block diagram of the comparator and address storage of FIG. 12.
Figure 15:
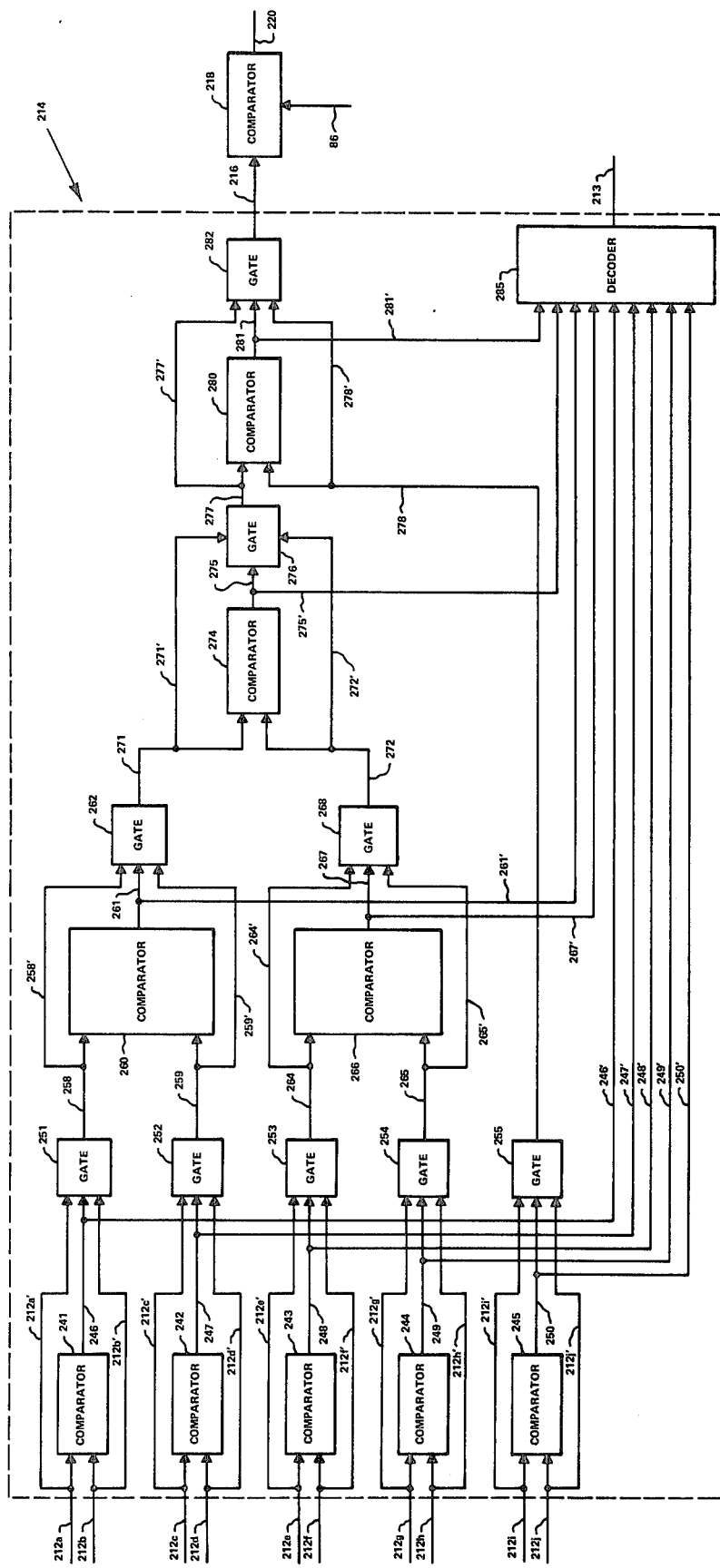
FIG. 15 is a block diagram of the comparator of FIG. 14.

Referring to FIG. 14, the address storage 210 of comparator and address storage registers 90 provides storage for the 10 cells with the largest number of points in them. The number of points in each of the 10 cells in address storage 210 are supplied to comparator 214 via line 212 (which is actually ten lines, 212a–j, as shown in FIG. 15). The address of the cell having the smallest count is supplied to address storage 210 by comparator 214 via line 213. Comparator 214 supplies the smallest count, via line 216, as a first input to comparator 218. The new values supplied via line 86 provides the second input to comparator 218 and is also supplied via lines 86 and 200 as a first input to gate 202. Lines 87, 88 and 89 supply the $X_{rij}$, $Y_{rij}$ and $\mu_{rij}$ information, respectively, to gate 202. If comparator 218 indicates that the value on line 86 is larger than that on line 216, comparator 218 supplies a signal to gate 202 via line 220. In response to a signal supplied via line 220, gate 202 supplies the signals of lines 86, 87, 88 and 89 to address storage 210 via lines 204, 205, 206 and 207, respectively. Thus the smallest cell in address storage 210 is replaced with the new value from random access memory 80 via line 86 and the new address, $X_{rij}$, $Y_{rij}$ and $\mu_{rij}$, from arithmetic unit 46 via lines 87, 88 and 89, respectively. If comparator 218 indicates that the value on line 86 is equal to or smaller than the value on line 216, gate 202 is not enabled and no change takes place in the contents of address storage 210.

After the matching sequence has been completed, the addresses of the 10 largest cells can be read from address storage 210 via data path 22 by minicomputer 20.

The operation of the comparator 214 can best be understood with reference to FIG. 15. The number of points in each of the 10 cells in address storage 210 are supplied to comparators 241–245 of comparator 214 via lines 212a–j and to gates 251–255 via lines 212a–j and 212a'–j'. The outputs of comparators 241–245 are supplied via lines 246–250 to gates 251–255 and via lines 246–250 and 246'–250' to decoder 285. The outputs of gates 251 and 252, respectively, are supplied via lines 258 and 259 to comparator 260 and via lines 258' and 259' to gate 262. The output of comparator 260 is supplied via line 261 to gate 262 and via lines 261 and 261' to decoder 285. The outputs of gates 253 and 254, respectively, are supplied via lines 264 and 265 to comparator 266 and via lines 264' and 265' to gate 268. The output of comparator 266 is supplied via line 267 to gate 268 and via lines 267 and 267' to decoder 285. The outputs of gates 262 and 268, respectively, are supplied via lines 271 and 272 to comparator 274 and via lines 271' and 272' to gate 276. The output of comparator 274 is supplied via line 275 to gate 276 and via lines 275 and 275' to decoder 285. The outputs of gates 276 and 255, respectively, are supplied via lines 277 and 278 to comparator 280 and via lines 277' and 278' to gate 282. The output of comparator 280 is supplied via line 281 to gate 282 and via lines 281 and 281' to decoder 285.

In the operation of comparator 214, the number of points in each of the 10 cells in address storage 210 are initially supplied in pairs to comparators in a degression producing the least number of points in the 10 cells as an output of gate 282 and which is supplied as a first input to comparator 218 via line 216. The outputs of each of the comparators is supplied to decoder 285 to identify the cell having the least number of cells. Decoder 285 provides the address of the cell having the least number of cells to address storage 210 via line 213. Minutiae-encoding consoles and minicomputers suitable for use in the above-described invention include:

Consoles

Vector General Corporation, 8399 Topanga Canyon Blvd. Canoga Park, Calif. 91304
Model DD 3
Hughes Aircraft Corporation, 6155 El Camino Real Carlsbad, Calif. 92008
Model C-9 Display Terminal Minicomputers Data General Corporation, Southboro, Mass. 01772
Model Nova 1200
Model Nova 800
Model Supernova SC
Digital Equipment Corporation, Maynard, Mass.
Models PDP-11/10
PDP-11/35 or
PDP-11/45
Texas Instrument Corporation, Houston, Tex.
Model TI-980A.

Although a preferred embodiment of the present invention has been illustrated and described, other changes will occur to those skilled in the art. For example, the implementation of the hardware minutiae matcher may be changed along with its functions. The matching of the fingerprints may take place in two stages with the first stage being a coarse, but rapid, testing of the file fingerprints to identify candidate file prints followed by a slower, more exacting processing of the previously identified file prints to reduce the number of candidate file prints for further/manual processing. The size of the area of the fingerprints encoded and/or the number of minutiae encoded may be varied. The minutiae-encoding console 16 may include a TV camera and monitor. It is therefore intended that the scope of the present invention is to be limited only by the scope of the appended claims.

I claim:

1. A method for automatically searching a computer readable file of minutiae-encoded fingerprints under the overall control of an electronic computer to identify for further processing those file fingerprints having the greatest degree of match with a search fingerprint comprising the steps of:
   (a) entering data representing the locations and direction of the minutiae of the search fingerprint, said data being independent of any registration between the search and file fingerprints;
   (b) matching the locations and direction of each and every one of the encodable minutiae of the search fingerprint contained in the entered data and the locations and direction of each and every one of the encoded minutiae of a file fingerprint;
   (c) generating a set of registration parameters for each pair of search and file fingerprint minutiae matched;
   (d) identifying any resulting clusters of said registration parameters;
   (e) Developing a matching score based on the number of said clusters and the number of said registration parameters in said clusters;
   (f) repeating steps (b) through (e) for at least a portion of the file of the minutiae-encoded fingerprints; and
   (g) selecting those file fingerprints having the highest degree of match for further processing.

2. A method for automatically searching a computer readable file of minutiae-encoded fingerprints under the overall control of an electronic computer to identify for further processing those sets of file fingerprints having the greatest degree of match with a set of search fingerprints comprising the steps of:
   (a) entering data representing the locations and direction of the minutiae of each of the fingerprints in the set of search fingerprints, said data being independent of any registration between the search and file fingerprints;
   (b) matching the locations and direction of each and every one of the encodable minutiae of the set of search fingerprints against the locations and direction of each and every one of the encoded minutiae of corresponding ones of the fingerprints in a set of file fingerprints;
   (c) generating a set of registration parameters for each pair of search and file fingerprint minutiae matched;
   (d) identifying any resulting clusters of said registration parameters;
   (e) developing a matching score based on the number of said clusters and the number of said registration parameters in said clusters;
   (f) repeating steps (b) through (e) for at least a portion of the file of the set of minutiae-encoded fingerprints; and
   (g) identifying those sets of file fingerprints in which at least one of the component fingerprints of a file set has more than a predetermined degree of match to a corresponding fingerprint of said set of search fingerprints.

3. The method of claim 2 wherein said step of identifying requires that more than one of the component fingerprints exceed said predetermined degree of match.

4. Apparatus for automatically searching a computer readable file of minutiae-encoded fingerprints under the overall control of an electronic computer to identify for further processing those file fingerprints having the greatest degree of match with a search fingerprint comprising:
   encoding means for entering data representing the locations and direction of the minutiae of the search fingerprint, said data being independent of any registration between the search and file fingerprints;
   comparison means for matching the locations and direction of each and every one of the encoded minutiae of the search fingerprint contained in the entered data and the locations and direction of each and every one of the encoded minutiae of a file fingerprint;

means to generate a set of registration parameters for each pair of search and file fingerprint minutiae matched;

means to identify any resulting clusters of said registration parameters; and scoring means to provide a matching score based on the number of said clusters and the number of said registration parameters in said clusters.

5. Apparatus for automatically searching a computer readable file of minutiae-encoded fingerprints under the overall control of an electronic computer to identify for further processing those sets of file fingerprints having the greatest degree of match with a set of search fingerprints comprising the steps of:

encoding means for entering data representing the locations and direction of the minutiae of each of the fingerprints in the set of search fingerprints, said data being independent of any registration between the search and file fingerprints, comparison means for matching the locations and direction of each and every one of the encodable minutiae of corresponding ones of the fingerprints in a set of file fingerprints;

means to generate a set of registration parameters for each pair of search and file fingerprint minutiae matched;

means to identify any resulting clusters of said registration parameters; and scoring means to provide a matching score based on the number of said clusters and the number of said registration parameters in said clusters.

* * * * *

UNITED STATES PATENT AND TRADEMARK OFFICE
CERTIFICATE OF CORRECTION

PATENT NO. : 4,185,270

DATED : January 22, 1980

INVENTOR(S) : Frederic P. Fischer II and Phillip G. Pflueger

It is certified that error appears in the above-identified patent and that said Letters Patent are hereby corrected as shown below:

Col. 3, line 58, change -- $(Y_s Y_b) \sin \mu_r$ -- to -- $(Y_s - Y_b) \sin \mu_r$ --

Col. 5, lines 35-36, change -- $\sin(\theta_{fi} = \theta_{si})$ -- to -- $\sin(\theta_{fi} - \theta_{si})$ --

Col. 8, line 10, Change -- $X_{fjJ}$ -- to -- $X_{fj}$ --

Signed and Sealed this

Twenty-second Day of July 1980

[SEAL]

Attest:

SIDNEY A. DIAMOND

*Attesting Officer*    *Commissioner of Patents and Trademarks*